United States Patent
Walker (10) Patent No.: US 8,449,798 B2
(45) Date of Patent: May 28, 2013

(54) HIGH DENSITY POWDERED MATERIAL LINER

(75) Inventor: Jerry L. Walker, Azle, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 13/128,094

(22) PCT Filed: Jun. 17, 2010

(86) PCT No.: PCT/US2010/039059
§ 371 (c)(1),
(2), (4) Date: Jul. 8, 2011

(87) PCT Pub. No.: WO2011/159305
PCT Pub. Date: Dec. 22, 2011

(65) Prior Publication Data
US 2012/0027883 A1 Feb. 2, 2012

(51) Int. Cl.
*B29C 43/02* (2006.01)
*B29C 43/10* (2006.01)
(52) U.S. Cl.
CPC .................. *B29C 43/102* (2013.01)
USPC ................ 264/3.1; 264/109; 425/78; 419/66
(58) Field of Classification Search
USPC .......... 425/1, 78, 345, DIG. 58; 264/3.1–3.5, 264/109–128; 419/3, 66; 102/307, 309
See application file for complete search history.

(56) References Cited

U.S. PATENT DOCUMENTS

| | | | |
|---|---|---|---|
| 3,375,108 A * | 3/1968 | Wyman, Sr. et al. | 419/5 |
| 3,924,510 A * | 12/1975 | Strunk et al. | 264/3.1 |
| 4,220,687 A * | 9/1980 | Christopher | 102/306 |
| 4,250,792 A * | 2/1981 | Deigmuller et al. | 264/3.1 |
| 4,290,486 A | 9/1981 | Regalbuto | |
| 5,098,487 A | 3/1992 | Brauer et al. | |
| 5,295,545 A | 3/1994 | Passamaneck | |
| 5,775,426 A | 7/1998 | Snider et al. | |
| 6,158,511 A | 12/2000 | Wesson | |
| 6,263,283 B1 | 7/2001 | Snider et al. | |
| 6,336,506 B2 | 1/2002 | Wesson | |
| 6,347,673 B1 | 2/2002 | Dailey | |
| 6,378,438 B1 | 4/2002 | Lussier et al. | |
| 6,386,288 B1 | 5/2002 | Snider et al. | |
| 6,446,719 B2 | 9/2002 | Ringgenberg et al. | |
| 6,446,720 B1 | 9/2002 | Ringgenberg et al. | |
| 6,527,052 B2 | 3/2003 | Nivens et al. | |
| 6,536,524 B1 | 3/2003 | Snider | |

(Continued)

FOREIGN PATENT DOCUMENTS

DE 102005059934 A1 8/2006

OTHER PUBLICATIONS

Glenn, Corbin S., Patent Application entitled, "Shaped Charge Liner Comprised of Reactive Materials," filed Mar. 9, 2010, U.S. Appl. No. 12/720,522.

(Continued)

*Primary Examiner* — Richard Crispino
*Assistant Examiner* — Thukhanh Nguyen (57) ABSTRACT

A die set for forming explosive charge liners from powdered material is provided. The die set comprises a die block defining a basin and a punch shaped to interact with the basin. The die block and the punch are configured to exclude powdered material from a center axis of the basin.

17 Claims, 7 Drawing Sheets

U.S. PATENT DOCUMENTS

| | | | |
|---|---|---|---|
| 6,554,081 B1 | 4/2003 | Brooks et al. | |
| 6,598,682 B2 | 7/2003 | Johnson et al. | |
| 6,732,798 B2 | 5/2004 | Johnson et al. | |
| 6,761,219 B2 | 7/2004 | Snider et al. | |
| 6,840,178 B2 | 1/2005 | Collins et al. | |
| 6,874,579 B2 | 4/2005 | Johnson et al. | |
| 6,896,059 B2 | 5/2005 | Brooks et al. | |
| 6,966,377 B2 | 11/2005 | Johnson et al. | |
| 7,011,027 B2 | 3/2006 | Reese et al. | |
| 7,036,594 B2 | 5/2006 | Walton et al. | |
| 7,182,138 B2 | 2/2007 | Behrmann et al. | |
| 7,243,725 B2 | 7/2007 | George et al. | |
| 7,284,612 B2 | 10/2007 | Ratanasirigulchai et al. | |
| 7,287,589 B2 | 10/2007 | Grove et al. | |
| 7,393,423 B2 | 7/2008 | Liu | |
| 7,428,921 B2 | 9/2008 | Grove et al. | |
| 7,451,819 B2 | 11/2008 | Chang et al. | |
| 7,533,722 B2 | 5/2009 | George et al. | |
| 7,571,768 B2 | 8/2009 | Cuthill | |
| 7,621,332 B2 | 11/2009 | Haney et al. | |
| 7,913,761 B2 | 3/2011 | Pratt et al. | |
| 8,156,871 B2 | 4/2012 | Behrmann et al. | |
| 2002/0178962 A1* | 12/2002 | Reese et al. | 102/476 |
| 2003/0131749 A1 | 7/2003 | Lussier | |
| 2004/0089449 A1 | 5/2004 | Walton et al. | |
| 2005/0011395 A1 | 1/2005 | Langan | |
| 2006/0118303 A1 | 6/2006 | Schultz et al. | |
| 2006/0266551 A1 | 11/2006 | Yang et al. | |
| 2007/0034369 A1 | 2/2007 | Ratanasirigulchai et al. | |
| 2007/0158109 A1 | 7/2007 | Zazovsky et al. | |
| 2008/0034951 A1 | 2/2008 | Evans et al. | |
| 2008/0289529 A1 | 11/2008 | Schilling | |
| 2009/0050321 A1 | 2/2009 | Rhodes et al. | |
| 2009/0078144 A1 | 3/2009 | Behrmann et al. | |
| 2009/0078420 A1 | 3/2009 | Caminari et al. | |
| 2009/0084552 A1 | 4/2009 | Behrmann et al. | |
| 2009/0183916 A1 | 7/2009 | Pratt et al. | |
| 2010/0096136 A1 | 4/2010 | Bourne et al. | |
| 2010/0132945 A1 | 6/2010 | Bell et al. | |
| 2010/0133005 A1 | 6/2010 | Bell et al. | |
| 2010/0230104 A1 | 9/2010 | Nölke et al. | |
| 2011/0000669 A1 | 1/2011 | Barlow et al. | |
| 2011/0155013 A1 | 6/2011 | Boyer et al. | |
| 2011/0209871 A1 | 9/2011 | Le et al. | |
| 2011/0219978 A1 | 9/2011 | Glenn | |
| 2012/0234194 A1 | 9/2012 | Glenn | |

OTHER PUBLICATIONS

Foreign Communication From a Related Counterpart Application—International Search Report and Written Opinion, PCT/US2010/039059, Mar. 30, 2011.

Office Action dated Apr. 13, 2012, U.S. Appl. No. 12/512,530, filed Jul. 30, 2009.

Foreign Communication From a Related Counterpart Application—International Search Report and Written Opinion, PCT/US2011/036156, Feb. 17, 2012.

Glenn, Corbin S., Application entitled, "Shaped Charge Liner Comprised of Reactive Materials," U.S. Appl. No. 13/463,458, filed May 3, 2012.

Office Action dated May 26, 2011, U.S. Appl. No. 12/512,530, filed Jul. 30, 2009.

Atwood, D.C., et al., "Flow Performance of Perforation Tunnels Created with Shaped Charges Using Reactive Liner Technology," Society of Petroleum Engineers (SPE) European Formation Damage Conference, May 2009, The Netherlands.

Fischer, S.H., et al., "A Survey of Combustible Metals, Thermites, and Intermetallics for Pyrotechnic Applications," 32nd AIAA/ASME/SAE/ASEE Joint Propulsion Conference, Jul. 1996, Sandia National Laboratories, Albuquerque, NM, US.

Foreign Communication From a Related Counterpart Application—International Search Report and Written Opinion, PCT/US2011/027638, Sep. 30, 2011.

Office Action dated Dec. 21, 2011, U.S. Appl. No. 12/720,522, filed Mar. 9, 2010.

Office Action Restriction dated Nov. 25, 2011, U.S. Appl. No. 12/512,530, filed Jul. 30, 2009.

Notice of Allowance dated Nov. 9, 2012, U.S. Appl. No. 12/512,530, filed Jul. 30, 2009.

Restriction Requirement dated Nov. 29, 2012, U.S. Appl. No. 13/610,855, filed Sep. 11, 2012.

Restriction Requirement dated Dec. 5, 2012, U.S. Appl. No. 13/104,014, filed May 9, 2011.

Notice of Allowance dated Dec. 6, 2012, U.S. Appl. No. 12/720,522, filed Mar. 9, 2010.

Office Action—Restriction Requirement dated Jul. 16, 2012, U.S. Appl. No. 12/720,522, filed Mar. 9, 2010.

Le, Cam Van, et al., Patent Application entitled, Perforating Gun Assembly and Method for Controlling Wellbore Pressure Regimes During Perforating, filed on Sep. 11, 2012, U.S. Appl. No. 13/610,853.

Le, Cam Van, et al., Patent Application entitled, Perforating Gun Assembly and Method for Controlling Wellbore Pressure Regimes During Perforating, filed on Sep. 11, 2012, U.S. Appl. No. 13/610,855.

Walker, Jerry L., Patent Application entitled, "High Density Powdered Material Liner", filed Jul. 31, 2012, U.S. Appl. No. 13/563,719.

Restriction Requirement dated Jul. 26, 2012, U.S. Appl. No. 13/104,014, filed May 9, 2011.

Restriction Requirement dated Sep. 27, 2012, U.S. Appl. No. 13/463,458, filed May 3, 2012.

* cited by examiner

HIGH DENSITY POWDERED MATERIAL LINER

CROSS-REFERENCE TO RELATED APPLICATIONS

This application claims priority to International Application No. PCT/US2010/039059, filed Jun. 17, 2010 and entitled "High Density Powdered Material Liner," which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hydrocarbons may be produced from wellbores drilled from the surface through a variety of producing and non-producing formations. The wellbore may be drilled substantially vertically or may be an offset well that is not vertical and has some amount of horizontal displacement from the surface entry point. In some cases, a multilateral well may be drilled comprising a plurality of wellbores drilled off of a main wellbore, each of which may be referred to as a lateral wellbore. Portions of lateral wellbores may be substantially horizontal to the surface. In some provinces, wellbores may be very deep, for example extending more than 10,000 feet from the surface.

A variety of servicing operations may be performed on a wellbore after it has been initially drilled. A lateral junction may be set in the wellbore at the intersection of two lateral wellbores and/or at the intersection of a lateral wellbore with the main wellbore. A casing string may be set and cemented in the wellbore. A liner may be hung in the casing string. The casing string may be perforated by firing a perforation gun or perforation tool. A packer may be set and a formation proximate to the wellbore may be hydraulically fractured. A plug may be set in the wellbore.

Perforation tools may comprise explosive charges that are detonated to fire the perforation tool, perforate a casing if present, and create perforations and/or tunnels into a subterranean formation proximate to the wellbore. It is desirable that the tunnels created in the subterranean formation be deep and as free of debris as possible to promote flow of fluids into or out of the subterranean formation. Debris may comprise fines released from the subterranean formation or created by the perforation and/or residue from the perforation tool, for example, metal shards blown out of the perforation tool by the explosive charges.

SUMMARY

In an embodiment, a die set for forming explosive charge liners from powdered material is disclosed. The die set comprises a die block defining a basin and a punch shaped to interact with the basin. The die block and the punch are configured to exclude powdered material from a center axis of the basin.

In an embodiment, a method of making an explosive charge liner is disclosed. The method comprises introducing powdered material into a basin defined by a die block, where a punch is shaped to interact with the basin, excluding the powdered material from a central portion of the basin, and pressing the punch into the powdered material in the basin to form the explosive charge liner.

In an embodiment, an apparatus is disclosed. The apparatus comprises a deep-penetrating explosive charge liner formed of powdered material held together by green strength having a hole in a narrow end of the liner.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Unless otherwise specified, any use of the term "couple" describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "upstream" meaning toward the surface of the wellbore and with "down," "lower," "downward," or "downstream" meaning toward the terminal end of the well, regardless of the wellbore orientation. The term "zone" or "pay zone" as used herein refers to separate parts of the wellbore designated for treatment or production and may refer to an entire hydrocarbon formation or separate portions of a single formation such as horizontally and/or vertically spaced portions of the same formation. The various characteristics mentioned above, as well as other features and characteristics described in more detail below, will be readily apparent to those skilled in the art with the aid of this disclosure upon reading the following detailed description of the embodiments, and by referring to the accompanying drawings.

Liners for shaped explosive charges in perforation tools may collapse and develop a high speed jet creating tunnels in a subterranean formation during a perforation event. Such liners may be referred to as shaped charge liners. It may be desirable for at least a portion of the shaped charge liner to comprise a dense material that is present in this high speed jet. The energy that is thus transferred to the dense material may be more effectively concentrated to promote deeper tunnels. It has been observed that some portions of the liner, for example a portion of the liner in an apex region of the liner, may trail behind the leading edge of the jet and hence may be a small contributor to the creation of tunnels in the subterranean formation. These portions may be referred to as a slug. The slug may degrade the condition of the tunnel, for example at least partially clogging and/or plugging the tunnel. In some contexts, shaped charge liners designed to produce deeper tunnels may be referred to as deep-penetrating (DP) liners.

Shaped charge liners may be formed of powdered material pressed into the desired shape in a die block by a punch, for example the powdered material may comprise one or more metal powders and possibly an admixture of powdered graphite. The liner formed of powdered material is held together by the green strength of the powdered material particles pressed with 40,000 pounds per square inch (PSI) force or more of force between the punch and the die block. Shaped charge liners formed of powdered material may disintegrate more fully in response to the energy of detonation of the shaped explosive charge, and hence the slug portion may have less of a clogging effect in the perforation tunnels. A liner may, for example, be formed by pouring a measured quantity of powdered material into a recess in a die block having the form of a cone opening upwards. This recess in the die block may be referred to as a basin.

After pouring the powdered material into the basin formed by the die block, a punch that is shaped to interact with the die block is extended into the basin. In an embodiment, the punch has a face that is similarly fitted to the basin. The face of the punch may not mate face to face with the basin, for example when a tapered shaped charge liner wall is desired. Additionally, the face of one of the punch or the basin may have a different texture, for example one face may be polished or smooth while the other face may be rough or circumferentially ridged. Alternatively, the face of the punch may mate face to face with the basin. As the punch extends into the basin, it pushes some of the powdered material aside and displaces some of the powdered material up the sides of the basin.

In an embodiment, the die block may rotate at between 4 RPM and 600 RPM, and the rotation may contribute to displacing and distributing the powdered material evenly within the die block. As the punch is extended into the basin it begins to compress the powdered material between the basin defined by the die block and the face of the punch. The die block may stop rotating in response to encountering the resistance of the powdered material pressing into the die block. In some cases the punch delivers full force on the powdered material in the apex of the cone shaped basin of the die block, thus compressing the powdered material in the apex to 100% of design density, while less than the full force is distributed to the powdered material along the sides of the die block, thus compressing the powdered material along the sides of the die block to less than 100% of design density. The powdered material along the sides of the basin may be compressed only, for example, to 50% of design density, to 60% of design density, to 80% of design density, or some other fraction of design density. The lower density of the sides of the shaped charge liner that results is thought to diminish the effectiveness of the shaped charge liner in penetrating the formation, because denser material is associated with deeper penetration of the jet. One desirable result could provide a shaped charge liner formed of powdered material with improved density along the sides of the liner. In other embodiments, tools and methods for making this improved shaped charge liner are desirable.

In an embodiment, powdered material is excluded from a central area of the basin of the die block, such that when the punch presses the powdered material in the basin of the die block, there is no powdered material in the apex of the basin—since this central area excludes powdered material—to otherwise reduce the distribution of the applied force to compress the powdered material along the sides of the basin of the die block. Consequently, the powdered material along the sides of the basin of the die block may be compressed with more force and hence achieve a higher density in areas that may more likely enhance the penetrating power of the jet. The shaped charge liner formed with this die block and punch defines an aperture or hole in the apex area of the liner, and in some contexts the liner may be said to define a straight-sided funnel shape or a truncated conical shape, with the aperture defined at the narrow end of the funnel shape. In an embodiment, in a separate process after compaction, a plug may be formed separately, possibly of low density material, and fitted into the aperture in the narrow end of the liner. The die block and punch may exclude powdered material from the apex of the die block by a pin that extends upwards from the basin of the die block into an aperture or hole on the axis of the punch or by a pin that extends downwards from the punch into an aperture or hole in the basin on the axis of the die block.

Figure 1:
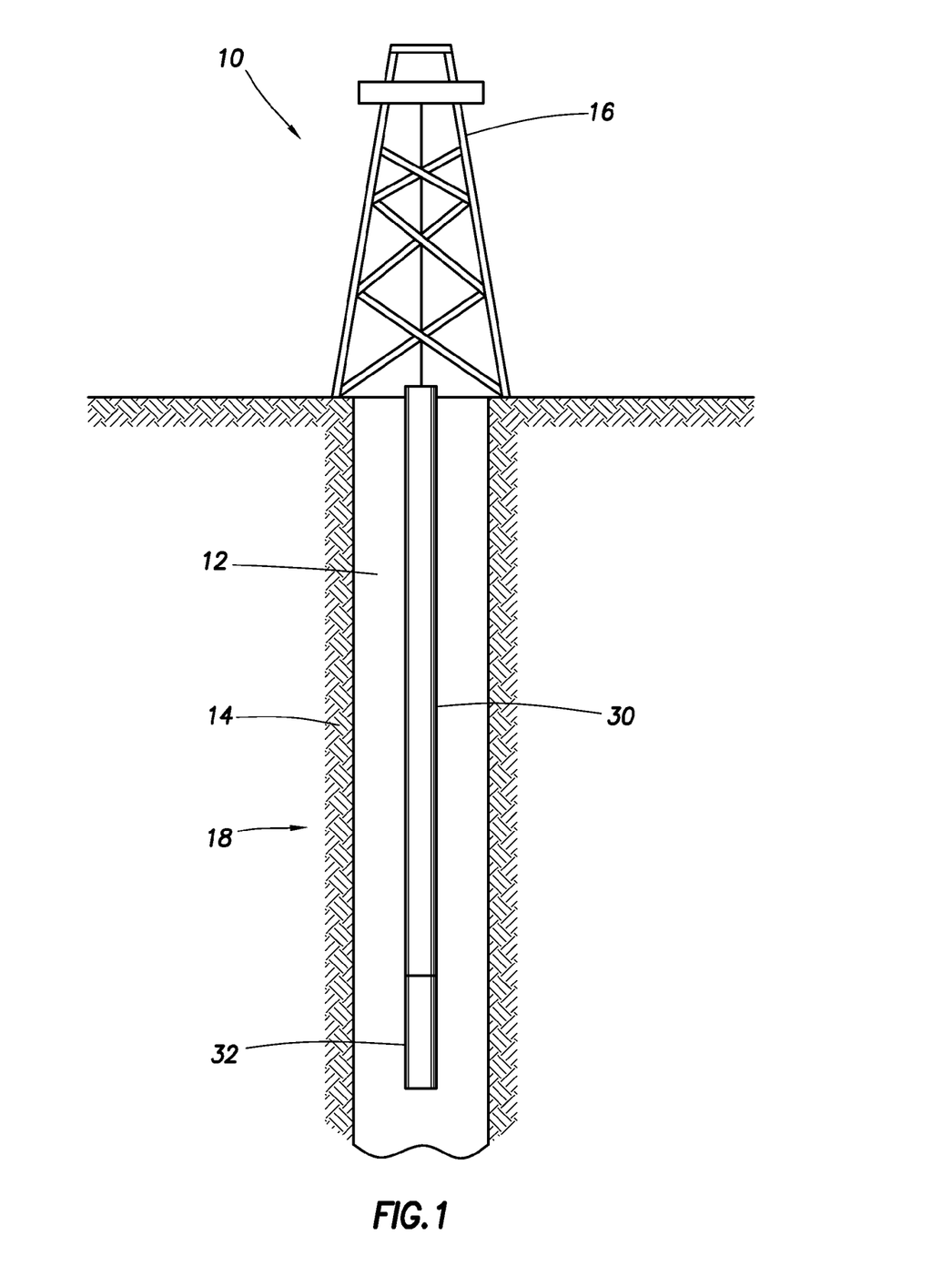
FIG. 1 is an illustration of a wellbore, a conveyance, and a perforation tool according to an embodiment of the disclosure.

Turning now to FIG. 1, a wellbore servicing system 10 is described. The system 10 comprises a servicing rig 16 that extends over and around a wellbore 12 that penetrates a subterranean formation 14 for the purpose of recovering hydrocarbons, storing hydrocarbons, disposing of carbon dioxide, or the like. The wellbore 12 may be drilled into the subterranean formation 14 using any suitable drilling technique. While shown as extending vertically from the surface in FIG. 1, in some embodiments the wellbore 12 may be deviated, horizontal, and/or curved over at least some portions of the wellbore 12. The wellbore 12 may be cased, open hole, contain tubing, and may generally comprise a hole in the ground having a variety of shapes and/or geometries as is known to those of skill in the art.

The servicing rig 16 may be one of a drilling rig, a completion rig, a workover rig, a servicing rig, or other mast structure and supports a workstring 18 in the wellbore 12, but in other embodiments a different structure may support the workstring 18, for example an injector head of a coiled tubing rigup. In an embodiment, the servicing rig 16 may comprise a derrick with a rig floor through which the workstring 18 extends downward from the servicing rig 16 into the wellbore 12. In some embodiments, such as in an off-shore location, the servicing rig 16 may be supported by piers extending downwards to a seabed. Alternatively, in some embodiments, the servicing rig 16 may be supported by columns sitting on hulls and/or pontoons that are ballasted below the water surface, which may be referred to as a semi-submersible platform or rig. In an off-shore location, a casing may extend from the servicing rig 16 to exclude sea water and contain drilling fluid returns. It is understood that other mechanical mechanisms, not shown, may control the run-in and withdrawal of the workstring 18 in the wellbore 12, for example a draw works coupled to a hoisting apparatus, a slickline unit or a wireline unit including a winching apparatus, another servicing vehicle, a coiled tubing unit, and/or other apparatus.

In an embodiment, the workstring 18 may comprise a conveyance 30, a perforation tool 32, and other tools and/or subassemblies (not shown) located above or below the perforation tool 32. The conveyance 30 may comprise any of a string of jointed pipes, a slickline, a coiled tubing, a wireline, and other conveyances for the perforation tool 32. In an embodiment, the perforation tool 32 comprises one or more explosive charges that may be triggered to explode, perforating a casing if present, perforating a wall of the wellbore 12 and forming perforations or tunnels out into the subterranean formation 14. The perforating may promote recovering hydrocarbons from the subterranean formation 14 for production at the surface, storing hydrocarbons flowed into the subterranean formation 14, or disposing of carbon dioxide in the formation 14, or the like.

Figure 2:
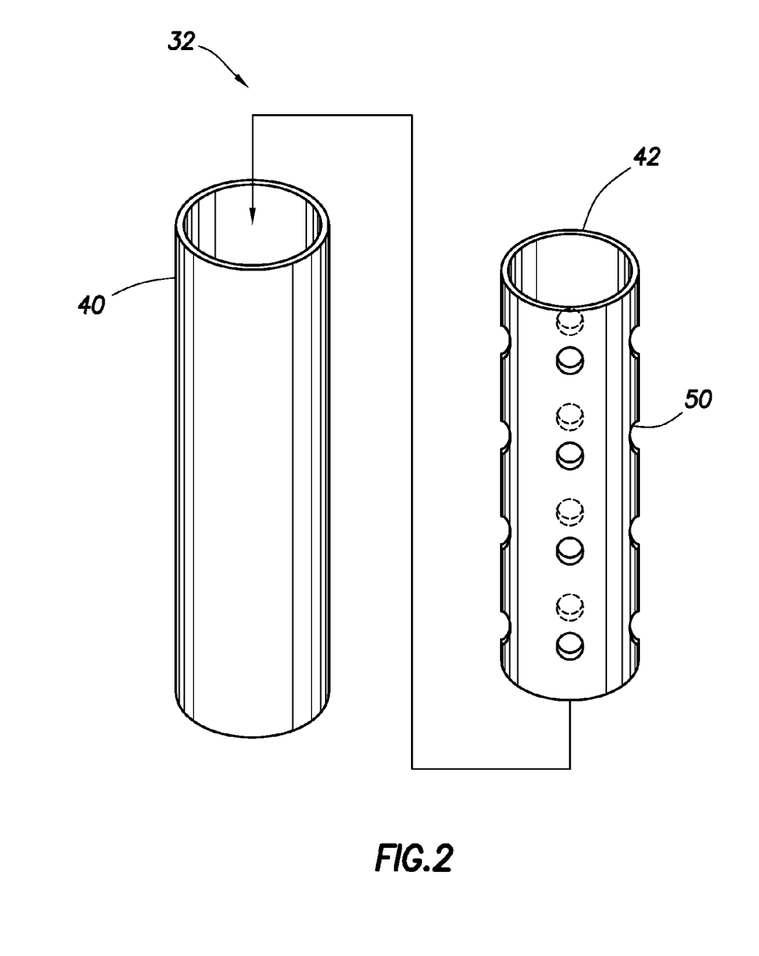
FIG. 2 is an illustration of a perforation tool according to an embodiment of the disclosure.

Turning now to FIG. 2, the perforation tool 32 is described. The perforation tool 32 may comprise a tool body 40, a charge carrier frame 42, and one or more explosive charge assembly 50. The tool body 40 contains charge carrier frame 42 and the explosive charge assemblies 50 and protects and seals them from the downhole environment prior to perforation. A surface of the tool body 40 may be bored and/or countersunk proximate to the explosive charge assemblies 50 to promote ease of perforation of the tool body 40 by detonation of the explosive charge assemblies 50. The bored and/or countersunk surface may be referred to as scalloping. The tool body 40 may comprise structures (not shown) to couple the perforation tool 32 to the conveyance 30 or to couple other tools to the perforation tool 32, either above or below the perforation tool 32. In an embodiment, the tool body 40 may comprise a male threaded end and a female threaded end. The tool body 40 may be constructed out of various metal materials as are known to those skilled in the art. The tool body 40 may be constructed of one or more kinds of steel including stainless steel, chromium steel, and other steels. Alternatively, the tool body may be constructed of other non-steel metals or metal alloys. Likewise, the charge carrier frame 42 may be constructed out of various metal materials, for example steel, aluminum, and/or other metals and/or metal alloys.

The explosive charge assemblies 50 may be disposed in a first plane perpendicular to the axis of the tool body 40, and additional planes or rows of additional explosive charge assemblies 50 may be positioned above and below the first plane. In an embodiment, four explosive charge assemblies 50 may be located in the same plane perpendicular to the axis of the tool body 40, 90 degrees apart. In an embodiment, three explosive charge assemblies 50 may be located in the same plane perpendicular to the axis of the tool body 40, 120 degrees apart. In other embodiments, however, more explosive charge assemblies 50 may be located in the same plane perpendicular to the axis of the tool body 40. The direction of the explosive charge assemblies 50 may be offset by about 45 degrees between the first plane and a second plane, to promote more densely arranging the explosive charge assemblies 50 within the tool body 40. The direction of the explosive charge assemblies 50 may be offset by about 60 degrees between the first plane and a second plane, to promote more densely arranging the explosive charge assemblies 50 within the tool body 40.

In an embodiment, the charge carrier frame 42 retains the explosive charge assemblies 50 in planes, oriented in a preferred direction, and with appropriate angular relationships between rows, and is disposed within the tool body 40. In an embodiment, a detonator cord couples to each of the explosive charge assemblies 50 to detonate the explosive charge assemblies 50. When the perforation tool 32 comprises multiple planes and/or rows of explosive charge assemblies 50, the detonator chord may be disposed on the center axis of the tool body 40. The detonator chord may couple to a detonator apparatus that is triggered by an electrical signal or a mechanical impulse or by another trigger signal. When the detonator activates, a detonation propagates through the detonation chord to each of the explosive charge assemblies 50 to detonate each of the explosive charge assemblies 50 substantially at the same time.

Figure 3:
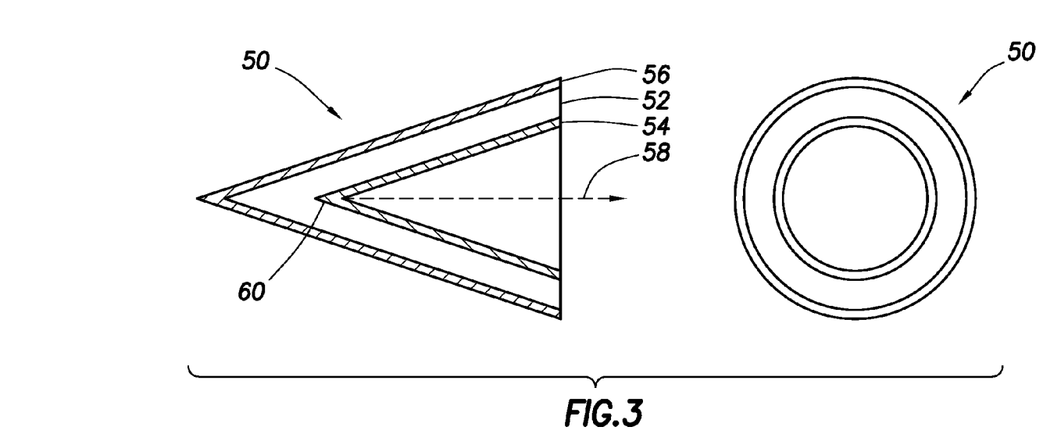
FIG. 3 is an illustration of a shaped explosive charge assembly according to an embodiment of the disclosure.

Turning now to FIG. 3, further details of the explosive charge assembly 50 are described. The explosive charge assembly 50 comprises a shaped explosive charge 52 and a first shaped charge liner 54. In an embodiment, the explosive charge assembly 50 may further comprise a shaped charge housing 56. The shaped explosive charge 52 is designed to focus explosive energy in a preferred direction, for example in the direction of an explosive focus axis 58. The shaped explosive charge 52, the first shaped charge liner 54, and the shaped charge housing 56 may nest generally as illustrated in FIG. 3 and may each take the general form of a solid of revolution. In a preferred embodiment, the first shaped charge liner 54 takes a conical shape but other shapes are contemplated. The shaped explosive charge 52, the first shaped charge liner 54, and the shaped charge housing 56 may take the general shape of nested open cones or straight sited funnels.

The shapes of the shaped explosive charge 52, the first shaped charge liner 54, and the shaped charge housing 56 need not each have the same shape. For example, in an embodiment, the first shaped charge liner 54 may have a triangular axial section, the shaped charge housing 56 may have an egg-shaped axial section, and the shaped explosive charge 52 may have one side shaped to fit to the egg-shaped form of the shaped charge housing 56 and another side shaped to fit to the cone shaped form of the first shaped charge liner 54. Additionally, the thickness of the walls of the shaped explosive charge 52, the first shaped charge liner 54, and the shaped charge housing 56 may have different thicknesses in different embodiments. An apex area 60 of the first shaped charge liner 54 is shown at the narrowed, point-like end of the generally conical form of the first shaped charge liner 54. In an embodiment, the shaped explosive charge 52 may be formed by pressing explosive powders between the shaped charge housing 56 and the first shaped charge liner 54, for example by applying force to the first shaped charge liner 54 of at least 10,000 PSI force directed towards the shaped charge housing 56.

Figure 4:
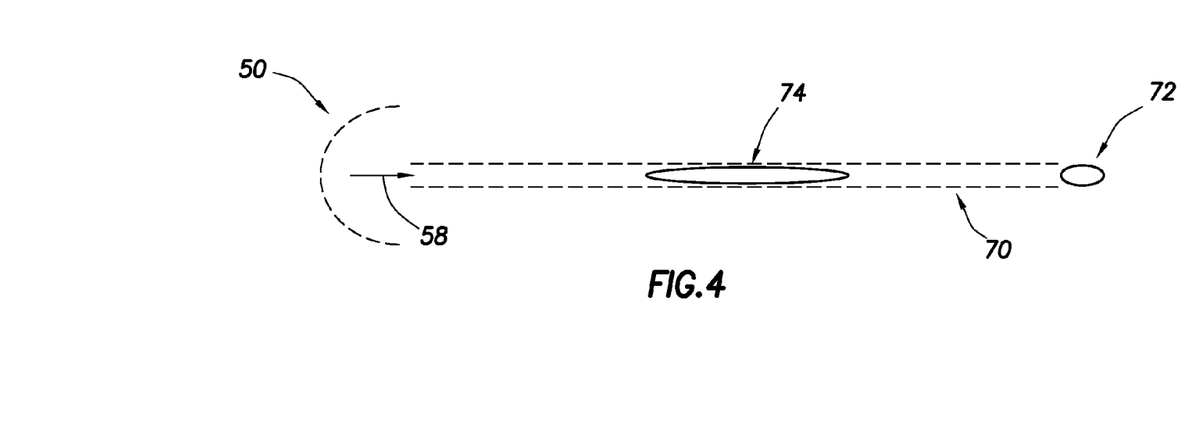
FIG. 4 is an illustration of an explosive jet penetrating a subterranean formation according to an embodiment of the disclosure.

Turning now to FIG. 4, a detonation jet of the explosive charge assembly 50 is described. When the shaped explosive charge 52 is detonated, for example by the propagation of a detonation from the detonator cord to the shaped explosive charge 52, the energy of the detonation is preferably concentrated and/or focused along the explosive focus axis 58 to promote deep penetration, forming a detonation jet 70 indicated by the dotted line. A portion of the first shaped charge liner 54 may form a projectile 72 that is accelerated by the energy of detonation and forms the leading edge of the detonation jet 70 as it penetrates into the subterranean formation 14 creating a perforation and/or tunnel in the subterranean formation 14. It is understood that the denser the material in the first shaped charge liner 54, excluding a small portion near the apex area 60 of the first shaped charge liner 54, the more efficiently and deeply the detonation jet 70 penetrates the subterranean formation 14. The projectile 72 preferably comprises dense material that may penetrate more effectively than less dense material. Another portion of the first shaped charge liner 54 may form a slug 74 that moves more slowly and lags behind the projectile 72. It is thought that the slug 74 does not assist substantially in the penetration of the subterranean formation 14 and instead contributes to fouling the perforation and/or tunnel by plugging flow paths.

One skilled in the art would appreciate that deep-penetrating liners share one or more characteristics and can be distinguished from other liners that are not intended for deep penetration applications. For example, a conical shaped or truncated conical shaped liner having a sharp apex angle or a narrow inside angle promotes deeper penetration versus a curved shaped liner, such as a half-egg shaped liner, or a shaped liner having a large radius at the apex. Likewise, deep-penetrating liners may be composed at least partly of dense materials, for example materials denser than 10 grams per cubic centimeter (g/cc), for example tungsten, tantalum, depleted uranium, gold, and other dense materials. It will be appreciated that such dense materials are more costly than lower density materials and hence would not likely be employed when deep penetration is not a design objective. Liners composed of powdered materials may be associated with deep penetration applications, while often other liners not intended for deep penetration may have liners stamped out of sheet metal.

Figure 5:
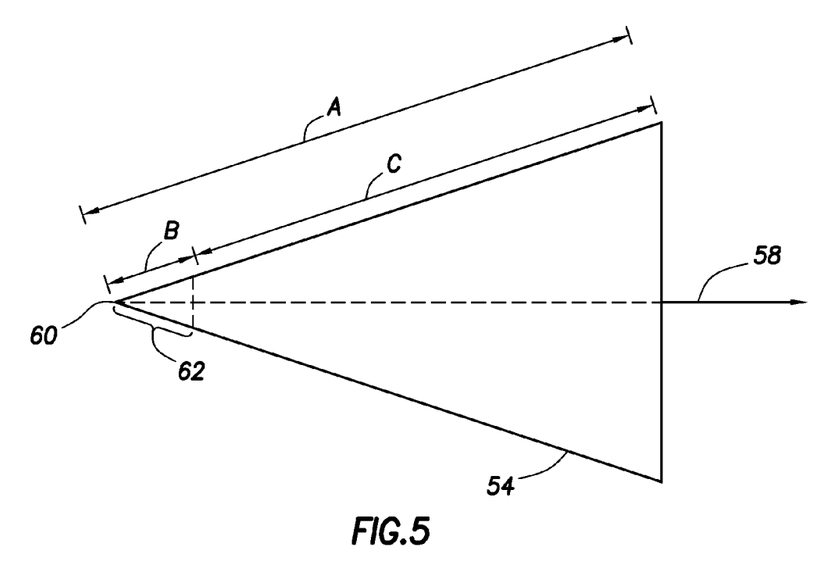
FIG. 5 is an illustration of a shaped charge liner according to an embodiment of the disclosure.

Turning now to FIG. 5, the first shaped charge liner 54 is discussed further. Generally, the material in the first shaped charge liner 54 close to the apex does not contribute significantly to the projectile 72. For example, an apex portion 62 of the first shaped charge liner 54 may contribute little to the deep-penetrating functionality of the explosive charge assembly 50. Length A illustrated in FIG. 5 corresponds to the length of the side of the first shaped charge liner 54. Length B and length C sum to the length A. Length B corresponds to the length of the side of the apex portion 62. In an embodiment, length B is less than 15% of length A, less than 10% of length A, or less than 8% of length A. The shape of the first shaped charge liner 54 may be referred to as conical shaped or straight-sided funnel shaped.

Figure 6:
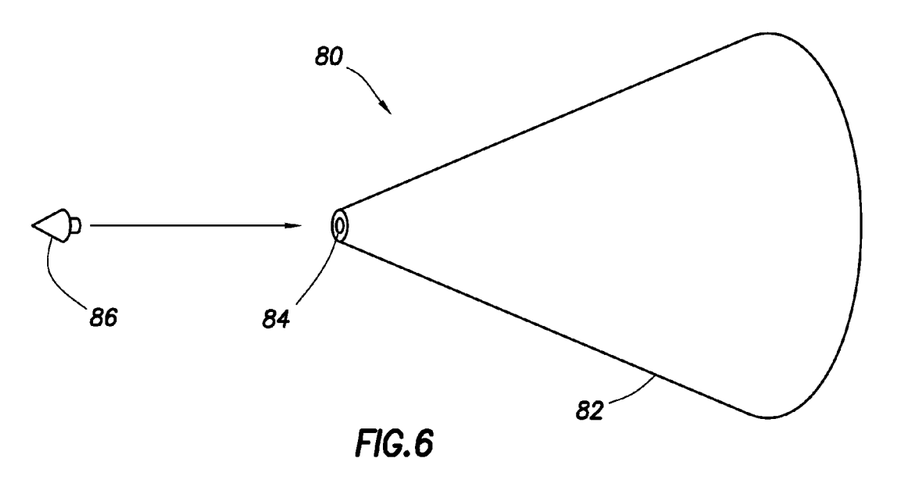
FIG. 6 is an illustration of another shaped charge liner according to an embodiment of the disclosure.

Turning now to FIG. 6, a second shaped charge liner 80 is described. In an embodiment, the second shaped charge liner 80 comprises a wall 82 formed of powdered material, for example formed by pressing powdered material in a die set. The wall 82 has a straight-sided funnel shape or a truncated cone shape with an aperture 84 at a narrow end of the wall 82. The powdered material may comprise fine particles of material, for example particles on average about 8 microns in diameter up to about 150 microns in diameter 50 microns in diameter. Alternatively, the powdered material may have some other diameter effective for promoting spalling off of the material upon detonation of the explosive charge assembly 50. The powdered material may comprise one or more of tungsten powder, tantalum powder, lead powder, copper powder, graphite powder, gold powder, and depleted uranium powder. The powdered material may comprise powdered metals. The powdered material may comprise combinations of reactive materials that react together in response to the detonation of the explosive charge assembly 50, for example, pairs of intermetallic reactants, pairs of thermite materials, and other reactive materials. For further details about the use of reactive materials in shaped charge liners, see U.S. patent application Ser. No. 12/720,522 filed Mar. 9, 2010, entitled "Shaped Charge Liner Comprised of Reactive Materials," by Corbin S. Glenn, which is hereby incorporated by reference in its entirety. The powdered material may comprise an admixture of other materials to assist in the self-adhering of the powdered material particles, to lubricate the die set, and/or to reduce wear on the die set and/or other tools.

In an embodiment, at least a portion of the powdered material may comprise materials having a density of at least 10 g/cc. Also, it is understood that the dense materials may be combined with other materials serving purposes secondary to the main purpose of encouraging deep penetration into the subterranean formation 14 and leaving the tunnels so formed unclogged, for example waxes, binders, lubricants, and anti-static agents to promote ease of manufacturing. In some cases, a relatively small amount of malleable metal powder may be mixed with one or more of the dense materials to reduce tooling wear, to promote ease of removal of the formed wall 82 from the die set, and/or to promote the ability of the pressed powdered material to hold together by green strength, for example one or more of copper, lead, and other malleable materials.

The wall 82 may be formed defining the aperture 84 to promote achieving higher density of the powdered material in the wall 82, as described below. In an embodiment, the second shaped charge liner 80 may further comprise a plug 86. The plug 86 may be fitted into the aperture 84. The plug 86 may be glued to remain in place fitted into the aperture 84. The end of the plug 86 may be held within the aperture 84 by a friction fit. The plug 86 may be located in an apex portion 62 of the second shaped charge liner 80 corresponding to the apex portion 62 of the first shaped charge liner 54 described above with reference to FIG. 5. Because the plug 86 is located in the apex portion 62 of the second shaped charge liner 80 it is not expected to contribute significantly to the deep penetration of the subterranean formation 14. In an embodiment, the plug 86 may be formed of relatively low density material, for example material having a density less than 10 g/cc. The plug 86 may be formed of any kind of material, including pressed powdered material, pressed powdered metals, non-metallic materials, and other materials. The plug 86 may be formed with an easily meltable material to attenuate the deleterious effect of the slug 74 on the tunnels formed in the subterranean formation 14. The plug 86 may be formed with a shoulder to provide a stopping point when inserting the plug 86 into the wall 82 and/or to transfer stress to the wall 82 during press forming of the shaped explosive charge 52. The plug 86 may have a terminal end that is pointed or rounded.

Figure 7:
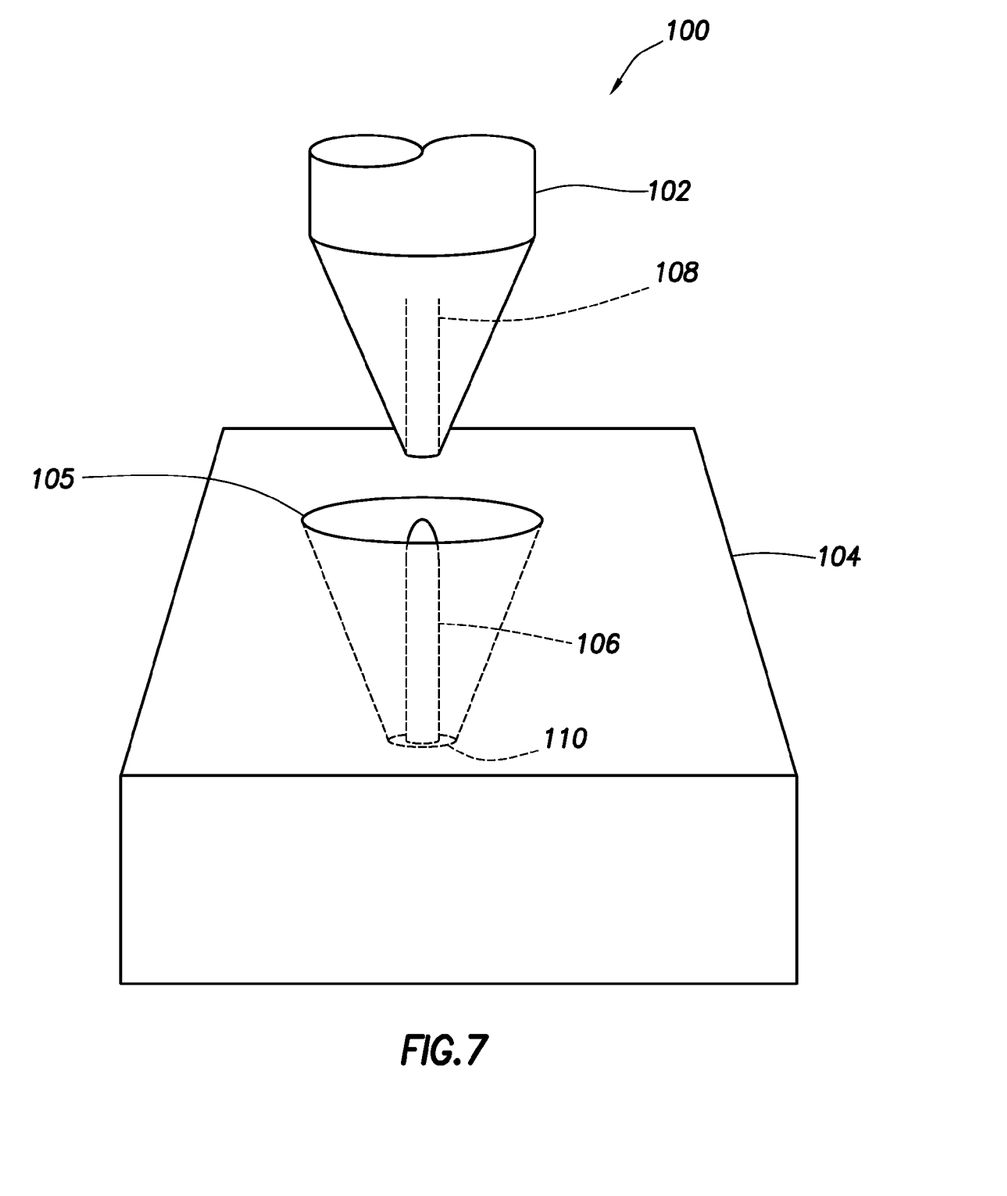
FIG. 7 is an illustration of a die set according to an embodiment of the disclosure.

Turning now to FIG. 7, a first die set 100 is described. The first die set 100 comprises a first punch 102 and a first die block 104. The first die block 104 defines a first funnel shaped basin 105 for receiving powdered material particles and a first pin 106 for excluding the powdered material particles from a center axis of the first basin 105. The powdered material is described in fuller detail with reference to FIG. 6 above. The first punch 102 defines a first aperture 108 that receives the first pin 106 as the first punch 102 is progressively lowered into the first basin 105 to press the powdered material to form the wall 82 of the second shaped charge liner 80. The first pin 106 extends upwards sufficiently that when a full measure of powdered material is poured into the first basin 105, the powdered material is below the top of the first pin 106.

In some contexts, the first pin 106 may be referred to as a shaft, an axle, or a post. The first pin 106 may have a variety of terminations on an end of the first pin 106 that mates with the first aperture 108. The terminations may be pointed, rounded, parabolic in shape, tapered, or otherwise narrowing at the end of the first pin 106. The termination may aid the mating of the first pin 106 with the first aperture 108. The first pin 106 and the interior of the first aperture 108 may be polished. The interior of the first aperture 108 may be lubricated, for example using a dry lubricant such as graphite or other dry lubricant. In addition to reducing friction between the first pin 106 and the first aperture 108, the dry lubricant may contribute to excluding the powdered material from entry into the first aperture 108. In an embodiment, the first pin 106 may have a diameter of about ⅛ inch, but in other embodiments other diameters may be employed. The diameter of the first pin 106 may be sized based on the ratio between length B and length A as described with reference to FIG. 5 and based on the desired length of the wall 82.

The face of the first punch 102 is angled so as to fit into the first basin 105 and to form the wall 82 of the second shaped charge liner 80 to have a substantially uniform thickness. In an embodiment, the angle that the exterior face of the first punch 102 makes with the axis of the first punch 102 is substantially equal to the angle that the interior face of the first basin 105 makes with the axis of the first die block 104. In an embodiment, the exterior face of the first punch 102 and/or the interior face of the first basin 105 are polished. The first pin 106 may retract partially into the first die block 104. The first die block 104 may further comprise one or more ejector pins (not shown) that may be actuated to protrude up through the first basin 105 to free the wall 82 after forming.

The first die block 104 may define a first lip 110 at the narrow end of the first basin 105. The first lip 110 may define a shoulder of the wall 82 proximate to the aperture 84 that is used by the plug 86 when being inserted into the wall 82. The width of the first lip 110 may be approximately the same width as the thickness of the wall 82, adjusting for the angle made between the wall 82 and the bottom of the first die block 104 (thus, the width of the first lip 110 may be slightly greater than the thickness of the wall 82).

Figure 8:
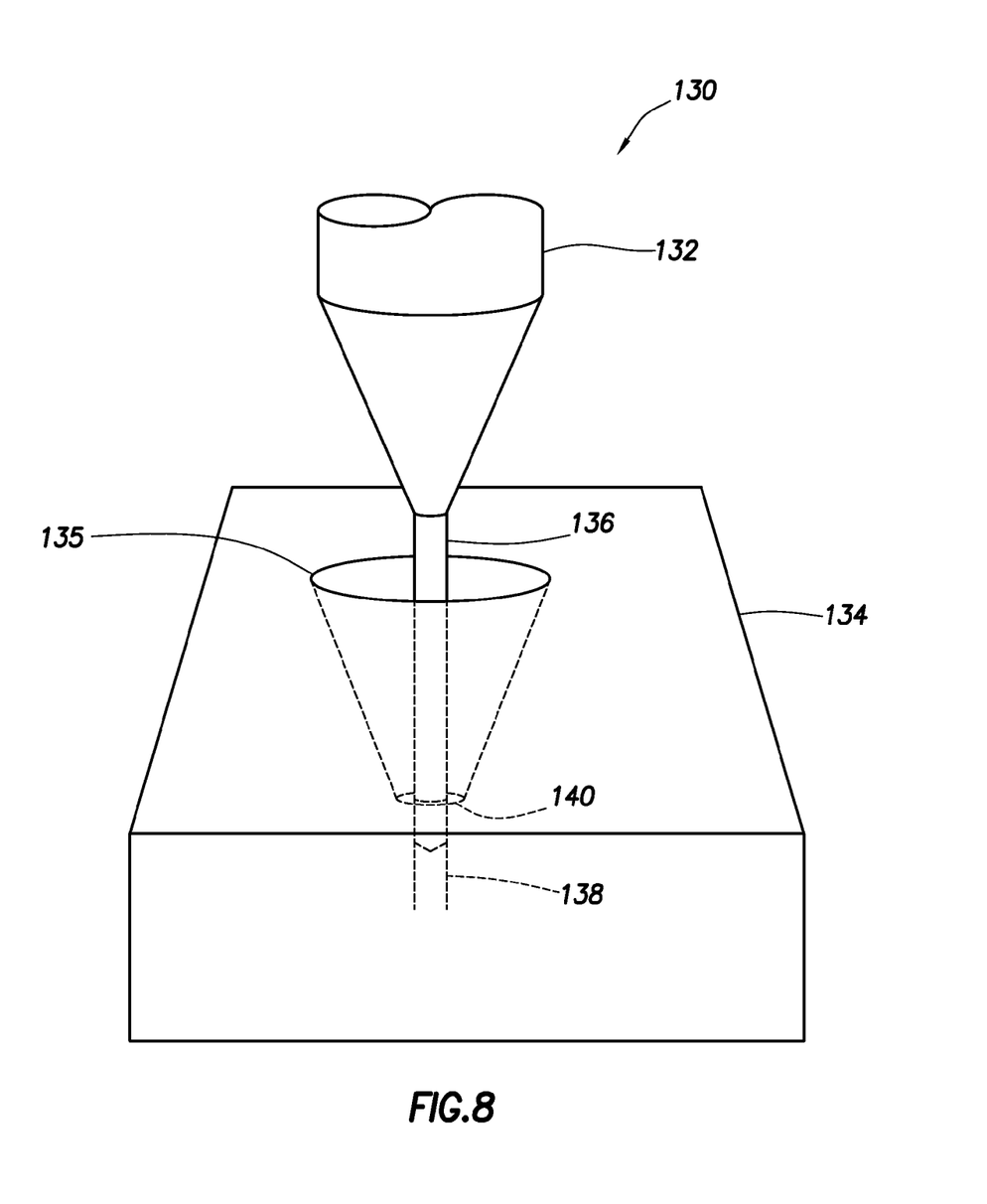
FIG. 8 is an illustration of another die set according to an embodiment of the disclosure.

Turning now to FIG. 8, a second die set 130 is described. The second die set 130 comprises a second punch 132 and a second die block 134. The second punch 132 comprises a second pin 136 that extends downwards to mate with a second aperture 138 defined by the second die block 134.

The second die block 134 defines a second straight-sided funnel or conical shaped basin 135. The second basin 135 receives powdered material particles, as described in fuller detail above with reference to FIG. 6, that are excluded from the center axis of the second basin 135 by the second pin 136. The second die block 134 may define a second lip 140 at the narrow end of the second basin 135. The second lip 140 may define a thickness of the wall 82 proximate to the aperture 84, in a manner similar to that described in fuller detail with reference to FIG. 7 above.

In some contexts, the second pin 136 may be referred to as a shaft, an axle, or a post. The second pin 136 may have a variety of terminations on an end of the second pin 136 that mates with the second aperture 138. The terminations may be pointed, rounded, parabolic in shape, tapered, or otherwise narrowing at the end of the second pin 136. The termination may aid the mating of the second pin 136 with the second aperture 138. The second pin 136 and the interior of the second aperture 138 may be polished. The interior of the second aperture 138 may be lubricated, for example using a dry lubricant such as graphite or other dry lubricant. In addition to reducing friction between the second pin 136 and the second aperture 138, the dry lubricant may contribute to excluding the powdered material from entry into the second aperture 138. In an embodiment, the second pin 136 may have a diameter of about ⅛ inch, but in other embodiments other diameters may be employed. The diameter of the second pin 136 may be sized based on the ratio between length B and length A as described with reference to FIG. 5 and based on the desired length of the wall 82.

The second die block 134 may further comprise one or more ejector pins (not shown) that may be actuated to protrude up through the second basin 135 to free the wall 82 after forming. The face of the second punch 132 is angled so as to fit into the second basin 135 and to form the wall 82 of the second shaped charge liner 80 to have a substantially uniform thickness. In an embodiment, the angle that the exterior face of the second punch 132 makes with the axis of the second punch 132 is substantially equal to the angle that the interior face of the second basin 135 makes with the axis of the second die block 134. In an embodiment, the exterior face of the second punch 132 and/or the interior face of the second basin 135 are polished.

Figure 9:
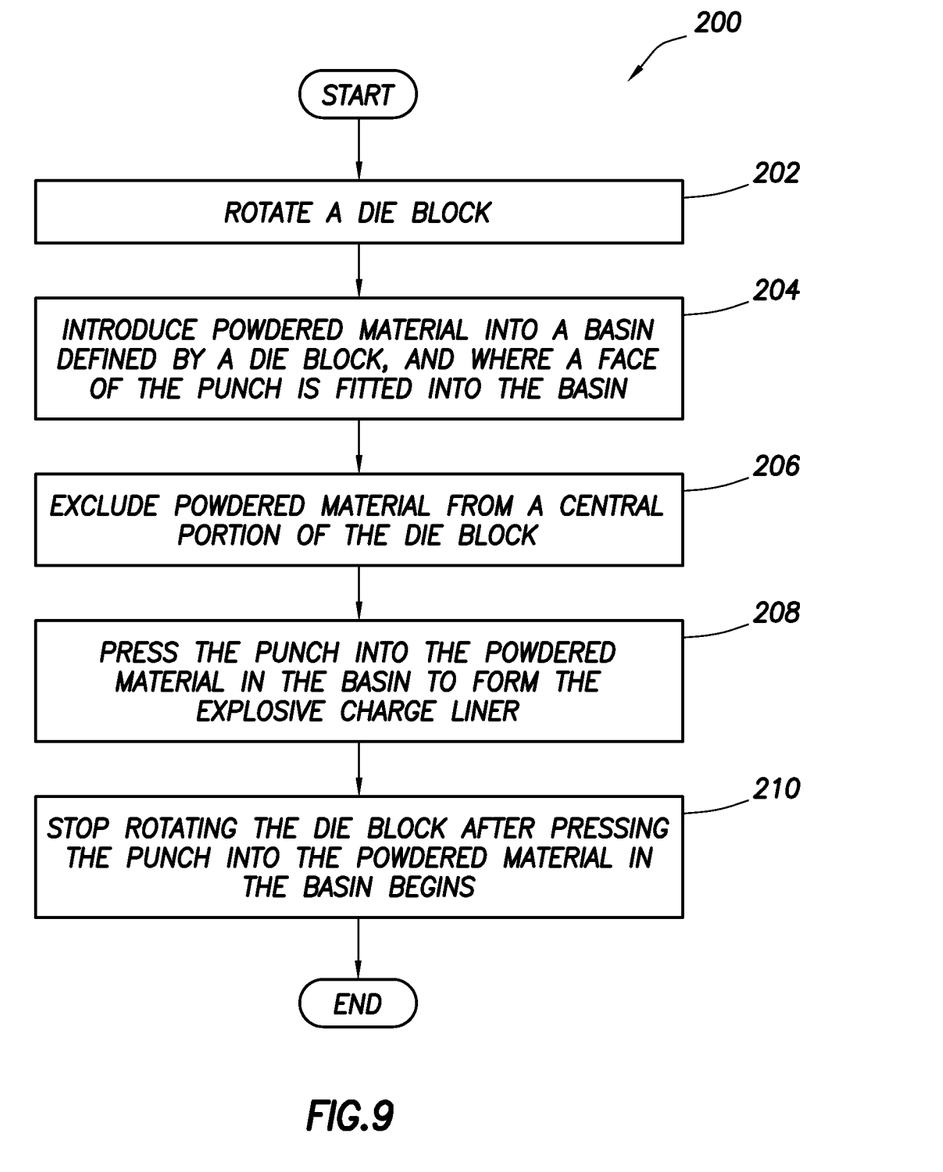
FIG. 9 is a flow chart of a method according to an embodiment of the disclosure.

Turning now to FIG. 9, a method 200 is described. At block 202, a die block is rotated. For example, the first or second die block 104, 134 is rotated. At block 204, powdered material is introduced into the die block 104, 134, where the die block 104, 134 defines a funnel shaped basin 105, 135 and where a face of the punch 102, 132 is fitted to the die block 104, 134. Prior to introducing the powdered material into the basin 105, 135, a dry lubricant may be applied to the aperture 108, 138. In an embodiment, the funnel shaped basin 105, 135 has straight rather than curved sides and defines a cone-like shape or a truncated cone-like shape. The powdered material may comprise one or more of tungsten powder, tantalum powder, lead powder, copper powder, graphite powder, gold powder, and depleted uranium powder. The powdered material may comprise powdered metals. The powdered material may comprise combinations of reactive materials that react together in response to the detonation of the explosive charge assembly 50, for example, pairs of intermetallic reactants, pairs of thermite materials, and other reactive materials. The powdered material may comprise an admixture of other materials to assist in the self-adhering of the powdered material particles and/or to reduce wear on the die set and/or other tools. The powdered material may be measured out by weight on the day of fabrication of the explosive charge liner.

At block 206, the powdered material is excluded from the central portion of the die block 104, 134, for example by one of the first and second pin 108, 138. At block 208, the punch 102, 132 is pressed into the powdered material in the die block 104, 134 to form the explosive charge liner. For example, the powdered material is pressed between the punch 102, 132 and the basin 105, 135 with at least 40,000 PSI force. At block 210, rotation of the die block 104, 134 may be stopped as the pressure applied by the punch 102, 132 exceeds a predefined level. The method 200 then ends. The formed explosive charge liner may be removed from the die set. In some cases, a plug such as the plug 86 may be inserted into the aperture 84 of the wall 82 of the second shaped charge liner 80.

Alternatively, when the second pin 136 is employed in method 200, the second punch 132 may be lowered partially to mate the second pin 136 with the second aperture 138, the position of the second punch 132 may be maintained, the powdered material is then introduced into the second basin 135 (the second pin 136 mated with the second aperture 138 then excludes the powdered material from the second aperture 138), and the second punch 132 then compresses the powdered material in the second basin 135 to form the second shaped charge liner 80. Additionally, instead of rotating the punch 102, 132, in an embodiment, the die block 104, 134 may be rotated.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of making an explosive charge liner having an improved density along the sides of the liner for use in an explosive charge, the method comprising:
    introducing powdered material into a basin defined by a die block, where a punch is shaped to interact with the basin, and wherein the powdered material comprises material denser than 10 grams per cubic centimeter;
    excluding the powdered material from a central portion of the basin;
    pressing the punch into the powdered material in the basin to form the explosive charge liner, wherein the explosive charge liner comprises an aperture in an apex area of the explosive charge liner corresponding to the central portion, and wherein the explosive charge liner achieves a design density along a length of the explosive charge liner based on the pressing, and
    fitting a plug into the aperture after the explosive charge liner is formed, wherein the combination of the plug fitted into the aperture and the explosive charge liner defines a shape, and wherein the plug contributes less than 10% of the length of an edge of the shape.

2. The method of claim 1, wherein the die block comprises a pin that excludes the powdered material from the central portion of the basin.

3. The method of claim 1, wherein the punch comprises a pin that extends through a hole in the die block and excludes the powdered material from the central portion of the basin.

4. The method of claim 1, further comprising rotating the die block, and wherein the powdered material is introduced into the basin before starting to rotate the die block or after starting to rotate the die block.

5. The method of claim 4, further comprising stopping rotating the die block after pressing the punch into the powdered material in the die block begins.

6. The method of claim 4, wherein the rotating the die block distributes the powdered material inside the basin as the punch is pressed into the powdered material.

7. The method of claim 1, wherein pressing the punch into the powdered material continues until at least a 40,000 pounds per square inch (PSI) of force is applied to the powdered material.

8. The method of claim 1, further comprising rotating the punch.

9. The method of claim 8, wherein the rotating the punch distributes the powdered material inside the basin as the punch is pressed into the powdered material.

10. The method of claim 1, wherein the powdered material comprises one or more of copper, tungsten, tantalum, lead, gold, and depleted uranium.

11. The method of claim 1, wherein the explosive charge liner defines a straight-sided funnel shape disposed substantially symmetrically around an explosive focus of the liner, and wherein the powdered material comprises powdered metal.

12. A method of making an explosive charge having a liner having an improved density along the sides of the liner, the method comprising:
    introducing powdered material into a basin defined by a die block, wherein the powdered material comprises material denser than 10 grams per cubic centimeter;
    excluding the powdered material from a central portion of the basin; and
    pressing a punch into the powdered material in the basin to form an explosive charge liner, wherein the punch is shaped to interact with the basin, wherein the explosive charge liner comprises an aperture in an apex area of the explosive charge liner, and wherein the explosive charge liner achieves a design density along a length of the explosive charge liner based on the pressing;
    inserting a plug into the aperture at the apex area of the explosive charge liner, wherein the combination of the plug inserted into the aperture and the explosive charge liner defines a shape, and wherein the plug contributes less than 10% of the length of an edge of the shape; and
    forming an explosive charge comprising the explosive charge liner, wherein the explosive charge comprises a casing, the explosive charge liner, and an explosive disposed between the casing and the explosive charge liner.

13. The method of claim 12, wherein the die block comprises an axially located pin to exclude powdered material from the center of the basin.

14. The method of claim 12, wherein the punch comprises a pin that extends through an axially located aperture defined by the die block to exclude powdered material from the center of the basin.

15. The method of claim 12, wherein the die block defines a flattened lip proximate to a narrow end of the basin and concentric with a center axis of the basin.

16. The method of claim 12, wherein the combination of the plug inserted into the aperture and the explosive charge liner defines a conical shape.

17. The method of claim 12, further comprising rotating the punch.

* * * * *